UNITED STATES PATENT OFFICE.

PAUL WINAND, OF COLOGNE, GERMANY.

METHOD OF OPERATING COMBUSTION-ENGINES.

970,152.  Specification of Letters Patent.  Patented Sept. 13, 1910.

No Drawing.   Application filed August 3, 1905. Serial No. 272,621.

*To all whom it may concern:*

Be it known that I, PAUL WINAND, engineer, a subject of the King of Belgium, residing at 1 Sudermannstrasse, Cologne-on-the Rhine, Germany, have invented certain new and useful Improvements in Methods of Operating Combustion-Engines; and I do hereby declare the following to be a full, clear, and exact description of the invention, such as will enable others skilled in the art to which it appertains to make and use the same.

The present invention relates to the operation of those combustion engines, wherein it it is of importance to minimize, as much as possible, the weight of the machine parts, the fuel and its containers, as well as to minimize the space required for their accommodation.

The invention is particularly applicable to combustion engines which are designed for the operation of submarine boats and torpedoes.

It has heretofore been proposed to use, instead of atmospheric air, pure oxygen or mixtures of air and oxygen, as oxidizing means for the fuel, in order to obtain a greater specific output for the engine, with given dimensions thereof. This greater specific output is due to the fact that a higher combustion temperature is attained, because of the lesser percentage of nitrogen present, thereby realizing a greater increase in pressure in the products of combustion, and therefore a greater mean piston pressure. In contrast to these former proposals, the present invention contemplates the employment of nitric peroxid or nitric di-oxid ($NO_2$) as the oxygen bearer. This substance is far superior for the purposes intended to all other substances known to me. With a given total weight of $NO_2$ and its containing receptacle, a far higher specific output of the engine can be obtained than is possible with oxygen, inasmuch as the complete combustion of a given fuel by means of $NO_2$ will produce a greater quantity of heat than combustion by means of oxygen.

In order to obtain an adequate conception of the superiority of nitric di-oxid, let us consider briefly the substances heretofore proposed for the same purpose; these substances are (1) the gaseous bodies, pure oxygen ($O_2$), and nitric oxid (NO), (2) the liquid bodies, nitric acid ($HNO_3$), and nitrous oxid ($N_2O$), and (3) the solid body, chlorate of potassium ($KClO_3$).

In the first place, $NO_2$ is superior, as a liquid, to the gaseous bodies O and NO, because of its high specific gravity, in consequence whereof large quantities by weight may be stored in a relatively small space. Furthermore, the liquid does not boil below 26° centigrade and, therefore, develops such slight pressure in the storage vessel, that the latter requires no thick walls and need be of but moderate weight. One kilogram of $NO_2$ occupies a volume of only 0.7 liters and contains 0.7 kilograms of oxygen, which, as a gas, occupies a space of 500 liters, (at 0°) and at atmospheric pressure. Pure oxygen, on the other hand, even under a compression of 150 atmospheres, occupies a volume of 3.3 liters; five times its weight is also to be added, for the extraordinarily heavy walled vessel necessary for its storage; whereas, for the substance $NO_2$ an addition of 20% suffices. For one kilogram of effective oxygen, the entire weight of the oxidizing body and its storage vessel or container, is:

When using pure oxygen, 1 kg. + 5 kg. = 6 kg.

When using $NO_2$, $\frac{1}{0.7}$ (1 + 0.2 kg.) = 1.7 kg.

Furthermore, in favor of the latter, is the very much smaller volume of the oxidizing body and its container, corresponding to the ratio 3.3:1. The substance $NO_2$ is also essentially superior for the purpose intended to the other oxids of nitrogen. Nitrous oxid ($N_2O$) has been proposed for this purpose, because it volatilizes readily, but at the ordinary temperature of volatilization, it develops a high pressure in the storage vessel or container, so that, for each kilogram of the fluid a very considerable addition to the weight of the container must be made, as against but 0.2 kg. for each kilogram of $NO_2$; furthermore, $N_2O$ contains very much less oxygen (*i. e.* for 1 kg. of $N_2O$ only 0.36 kg. of oxygen). Furthermore, nitric di-oxid, $NO_2$, is superior to all of the liquid and solid oxygen bearers, for the purposes intended because of its higher yield of oxygen, by which is to be understood the ratio of the weight of the oxygen contained in the substance to the weight of the substance itself. For instance, the relative yield of oxygen, for $NO_2$, is represented by 0.7; for $HNO_3$, by 0.64; for $N_2O$, by 0.53; and for $KClO_3$, by 0.39. Nitric di-oxid is furthermore superior to nitric acid, inasmuch as it does not preceptibly attack metals like iron, nickel and aluminum, and that it can be drawn more readily into a piston engine or pump, because of its lower boiling point, or can be brought to the desired advantageous operating pressure by moderate heating, by means of the waste products of combustion. Nitric di-oxid ($NO_2$) has a further advantage over nitrous oxid ($N_2O$) in that its individual pressure is lower than that of $N_2O$, (which, for instance, has a pressure of 55 atmospheres at 20° centigrade) and, therefore, requires less weight for its containing vessel. Finally, a further advantage in favor of nitric di-oxid with respect to the solid body $KClO_3$ (chlorate of potash) is that it produces only gaseous products of combustion, all of which contribute to the production of work. Nitric di-oxid, therefore, presents a bearer of oxygen peculiarly adapted to the purposes in hand. Inasmuch, however, as the use of nitric di-oxid and fuel alone in the right proportion for the production of complete combustion would develop excessively high temperatures, the employment of a diluting medium is practically necessary.

The most suitable diluting medium would, of course, be the sea water roundabout, which, introduced during the combustion, would bind the heat by the steam developed, which latter would then contribute work to that accomplished by the gases of combustion. This expedient can only be made available, however, for those engines in which the salt separated by the evaporation would exert no disturbing influence (e. g. for turbines). For engines for which sea water cannot be employed as a diluting medium (piston engines) the introduction of a special diluting medium is necessary, unless the waste products of combustion are used for the purpose. From a practical standpoint, having in mind the necessity for moderate weight and volume, a liquid only can be considered as such special diluting medium. The most suitable liquid would be the one which develops the greatest working volume of vapor upon its introduction during combustion. For this purpose, those liquids present special advantages whose vapors when decomposed into their constituents by the heat of the combustion, increase in volume. Ammonia is one example; it is decomposed according to the formula $NH_3 = N + H_3$, and, in decomposing, doubles its volume.

One means for avoiding the introduction of a special diluting medium (for the purpose of economy in the weight of the receptacle) consists in using the fuel as a diluting medium, i. e., by using a sufficient excess of fuel. Working with an excess of fuel, in contrast to working with an excess of the oxygen bearer (e. g., air) has the advantage that the fuel is generally cheaper than the artificial oxygen bearer. A further saving of weight may be attained by introducing the oxygen bearer ($NO_2$) and the fuel in a mixed condition, so that only one container is necessary for both materials. Of course, in that case, a fuel must be chosen which will mix intimately with the $NO_2$ and which will not thereafter segregate from it in the container. Moreover, the mixture must not have the properties of an explosive in the sense that ignition at any one point would propagate itself immediately throughout the entire mass. A suitable body which fulfils this requirement even as a chemical combination is, for instance, nitrate of ammonia, which has the formula $NH_4NO_2$ and which is transformed, i. e. "burned" when heated to a given temperature according to the formula

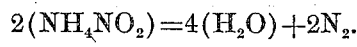
$$2(NH_4NO_2) = 4(H_2O) + 2N_2.$$

Having thus described my invention, what I claim is:—

1. The method of effecting combustion in combustion engines under conditions which exclude supplying air directly from the atmosphere to the engine, as, for instance, in submarine boats, torpedoes, and the like, which consists in effecting the combustion of the motive fluid by means of nitric dioxid ($NO_2$) as the oxygen bearer, and making up for the deficiency of the released nitrogen to moderate the otherwise destructive heat of combustion, by supplying to the charge a compensating heat-absorbing diluent; substantially as described.

2. The method of effecting combustion in combustion engines under conditions which exclude supplying air directly from the atmosphere to the engine, as, for instance, in submarine boats, torpedoes, and the like, which consists in effecting the combustion of the motive fluid by means of nitric dioxid ($NO_2$) as the oxygen bearer, and making up for the deficiency of the released nitrogen to moderate the otherwise destructive heat of combustion, by supplying to the charge a compensating heat-absorbing diluent, the combustion taking place only within the engine itself, thereby avoiding back-firing; substantially as described.

3. The method of effecting combustion in combustion engines under conditions which exclude supplying air directly from the atmosphere to the engine, as, for instance, in submarine boats, torpedoes, and the like, which consists in effecting the combustion of the motive fuel by means of nitric di-oxid ($NO_2$) as the oxygen bearer, together with a heat-absorbing diluent consisting of a fluid whose vapors are decomposed at the temperature of combustion; substantially as described.

4. The method of effecting combustion in combustion engines under conditions which exclude supplying air directly from the atmosphere to the engine, as, for instance, in submarine boats, torpedoes and the like, which consists in effecting the combustion of the motive fuel by means of nitric di-oxid ($NO_2$) as the oxygen bearer, together with ammonia; substantially as described.

5. The method of effecting combustion in combustion engines under conditions which exclude supplying air directly from the atmosphere to the engine, as, for instance, in submarine boats, torpedoes, and the like, which consists in preliminarily admixing the fuel with a supply of nitric di-oxid ($NO_2$) so as to make up a storage quantity thereof, of a composition such that ignition at the place of combustion will not propagate itself into the body contained in the storage receptacle, and subsequently effecting the combustion of the fuel by the nitric di-oxid as oxygen bearer; substantially as described.

6. The method of effecting combustion in combustion engines under conditions which exclude supplying air directly from the atmosphere to the engine, as, for instance, in submarine boats, torpedoes and the like, which consists in preliminarily admixing the fuel with a supply of nitric di-oxid ($NO_2$) so as to make up a storage quantity thereof, said nitric di-oxid forming a constituent of a chemical compound decomposable at the heat of combustion, and subsequently effecting the combustion of the fuel constituent by the nitric di-oxid constituent as oxygen bearer; substantially as described.

In testimony whereof I have affixed my signature, in presence of two witnesses.

PAUL WINAND.

Witnesses:
MICHEL DE VRIES,
PRUDENT BRACK.